(12) United States Patent
Tsai et al.

(10) Patent No.: US 7,241,019 B1
(45) Date of Patent: Jul. 10, 2007

(54) REFLECTIVE REAR LIGHT FOR A TRUCK

(75) Inventors: Hsi-Hsien Tsai, Tainan (TW); Li-Chun Lin, Tainan (TW); Zheng-Chang Zheng, Kaohsiung Hsien (TW)

(73) Assignee: Lucidity Enterprise Co., Ltd., Tainan (TW)

( * ) Notice: Subject to any disclaimer, the term of this patent is extended or adjusted under 35 U.S.C. 154(b) by 0 days.

(21) Appl. No.: 11/434,778

(22) Filed: May 17, 2006

(51) Int. Cl.
*G02B 5/12* (2006.01)
*B60Q 1/56* (2006.01)

(52) U.S. Cl. ............... 359/520; 359/528; 362/497; 362/498; 362/499; 362/545

(58) Field of Classification Search ............... None
See application file for complete search history.

(56) References Cited

U.S. PATENT DOCUMENTS 7,160,008 B2 * 1/2007 Pan .................... 362/497
2005/0094405 A1 * 5/2005 Tatewaki et al. ......... 362/341

* cited by examiner

*Primary Examiner*—James Phan

(57) ABSTRACT

A reflective rear light for a truck includes a bottom base, a light base, a circuit board, a reflective plate unit and a light lens unit. The circuit board is formed integral, provided with plural LED lights divided into plural indicting sections. Further the LED lights of all the indicating sections are matched with a reflective plate for reflecting light to reinforce the LED lights and to gain better effects.

4 Claims, 6 Drawing Sheets

REFLECTIVE REAR LIGHT FOR A TRUCK

BACKGROUND OF THE INVENTION

1. Field of the Invention

This invention relates to a reflective rear light for a truck, particularly to one consisting of a bottom base, a light base, a circuit board, a reflective plate unit and a light lens unit, with the circuit board made integral. LED lights are mounted on the circuit board, divided into several sections for indicating different objects. Then the LED lights are matched with reflective plates so that LED lights are reinforced to gain better effects.

2. Description of the Prior Art

A conventional truck rear light shown in FIG. 1 includes a bottom base A1, a reversing light lens A30, a main light lens A20 and a license plate lens A40 fixed respectively in a front and a bottom side of the bottom base A1. A main light base A2 is installed in the bottom base A1, facing to the main light lens A20. A reversing light base A3 is fixed on the main light base A2, facing to the reversing light lens A30. A license plate light lens A40 is fixed under the rear side of the main light base A2, and a side light base A5 is covered with a side light lens A50, fixed at an outer side of the bottom base A1. The main light base A2, the reversing light base A3, the license plate light base A4 and the side light base A5 are respectively combined stably with sealed circuit boards A21, A31, A41 and A51 and LED lights A22, A32, A42 and A52. Then LED lights and sealed circuit boards are sealed with water-proof glue to form several single lights, and then combined with the bases, thus forming a truck rear light provided with the illuminating and identifying functions of a brake light, a tail light, a reversing light, a side indicating light (indicating a side or a direction) and a license-plate light.

Next, the main light base A2, the reversing light base A3, the license plate light base A4 and the side light base A5 are respectively matched with the circuit boards A21. A31, A41, and A51 and relative LED lights A22, A32, A42 and A52 for lighting different sections, complicating largely assembling work, in addition to insufficient brightness of the LED lights.

SUMMARY OF THE INVENTION

The purpose of the invention is offer a reflective rear light for a truck, which consists of an integral circuit board, and LED lights mounted on the circuit board in several divided sections for different indications, and additionally provided with a reflecting plate unit for the light sections so that the LED lights may be reinforced to get higher effect.

The feature of the invention is a circuit board, which is installed in a light base and provided with a main light section, a license-plate light section, and a side light section. And all the light sections are provided with plural LED lights, with the license-plate light section and the side light section facing openings of the sides of the bottom base. Further, a reflecting plate nuts consisting of a main reflecting plate, a license-plate reflecting plate and a side light reflecting plate for reflecting LED lights of each section so that the LED lights may be reinforced by the reflecting plate unit to gain better effect.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
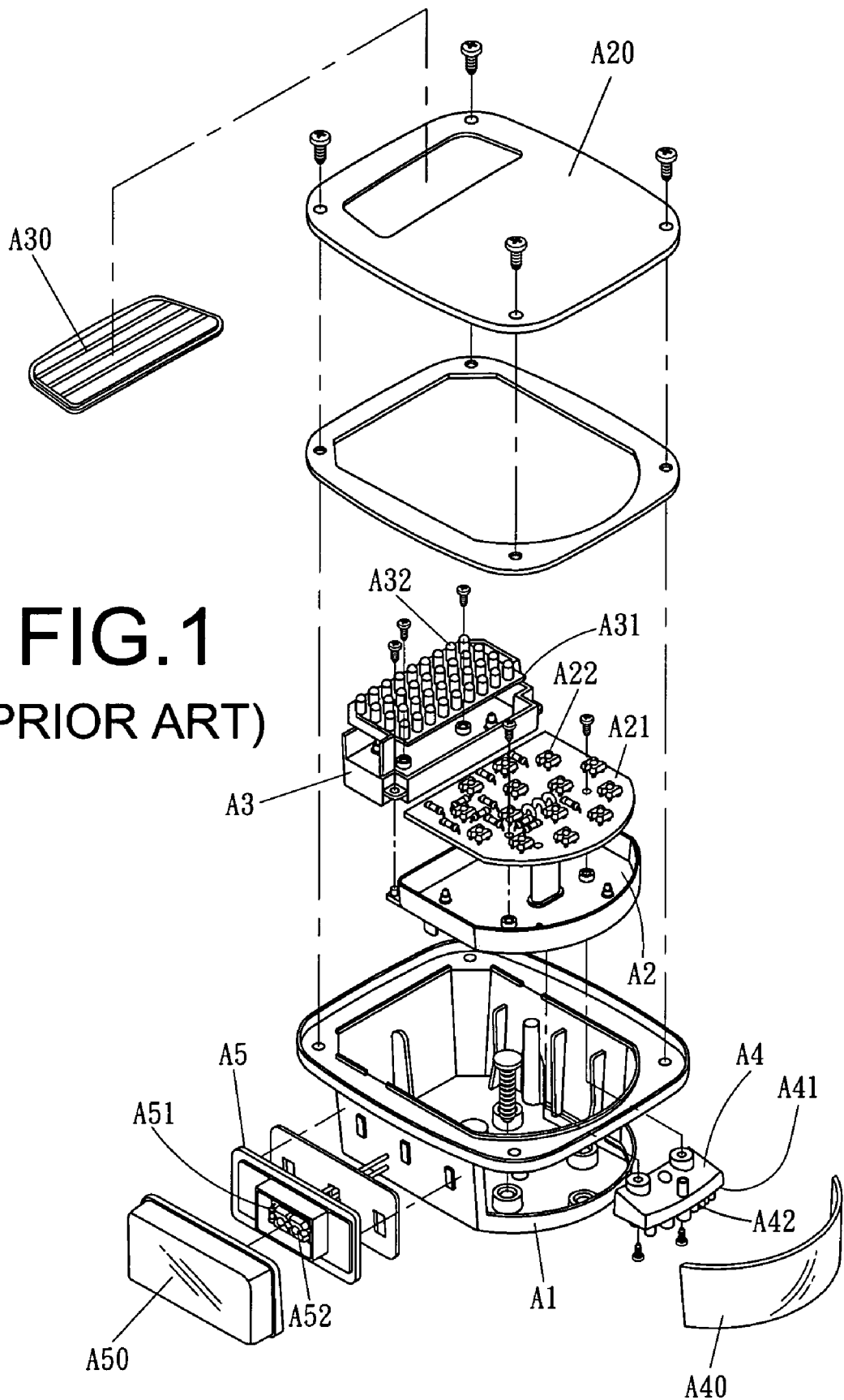
FIG. 1 is an exploded perspective view of a conventional truck rear light.
Figure 2:
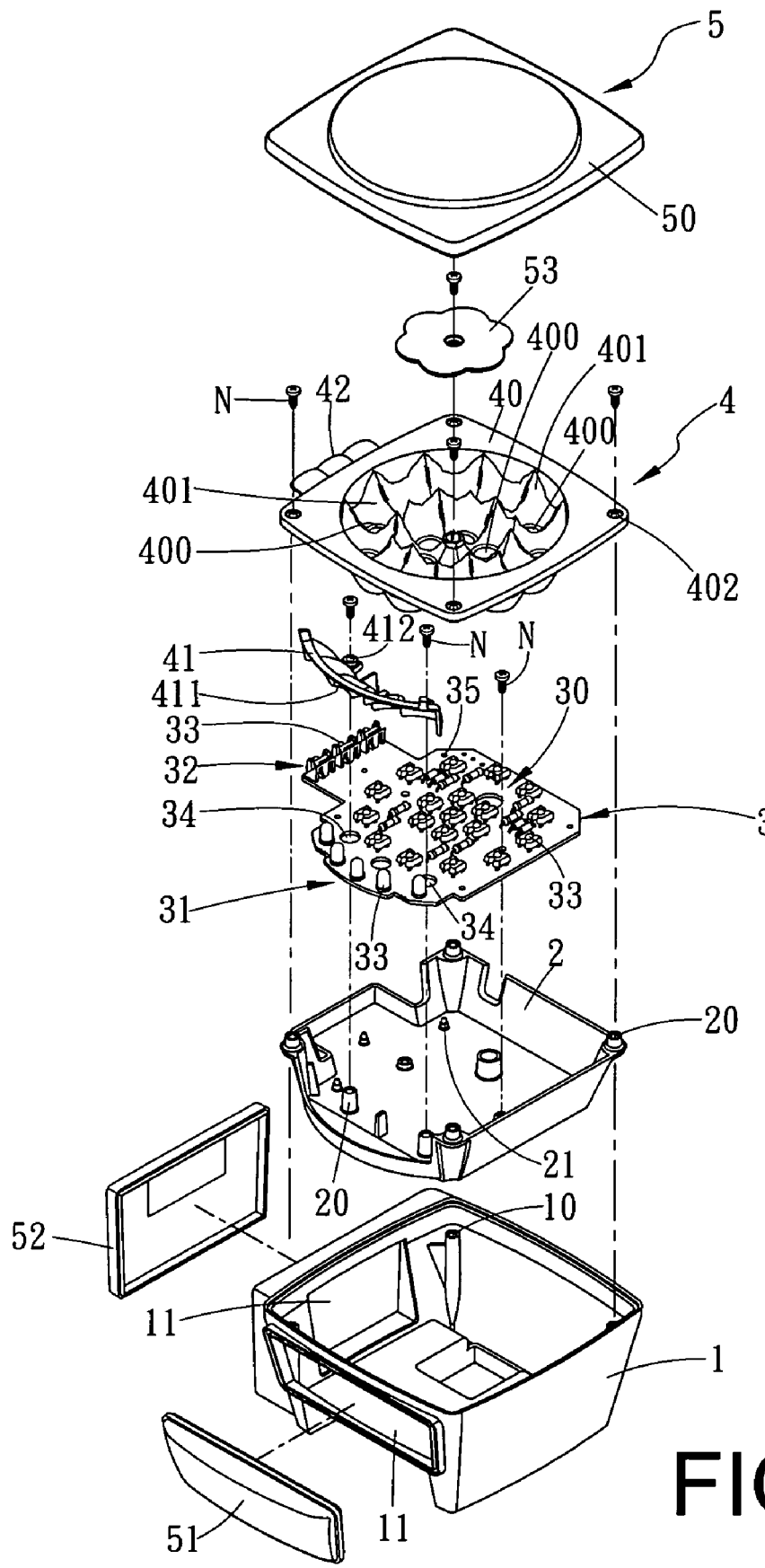
FIG. 2 is an exploded perspective view of a reflective rear light for a truck in the present invention.
Figure 3:
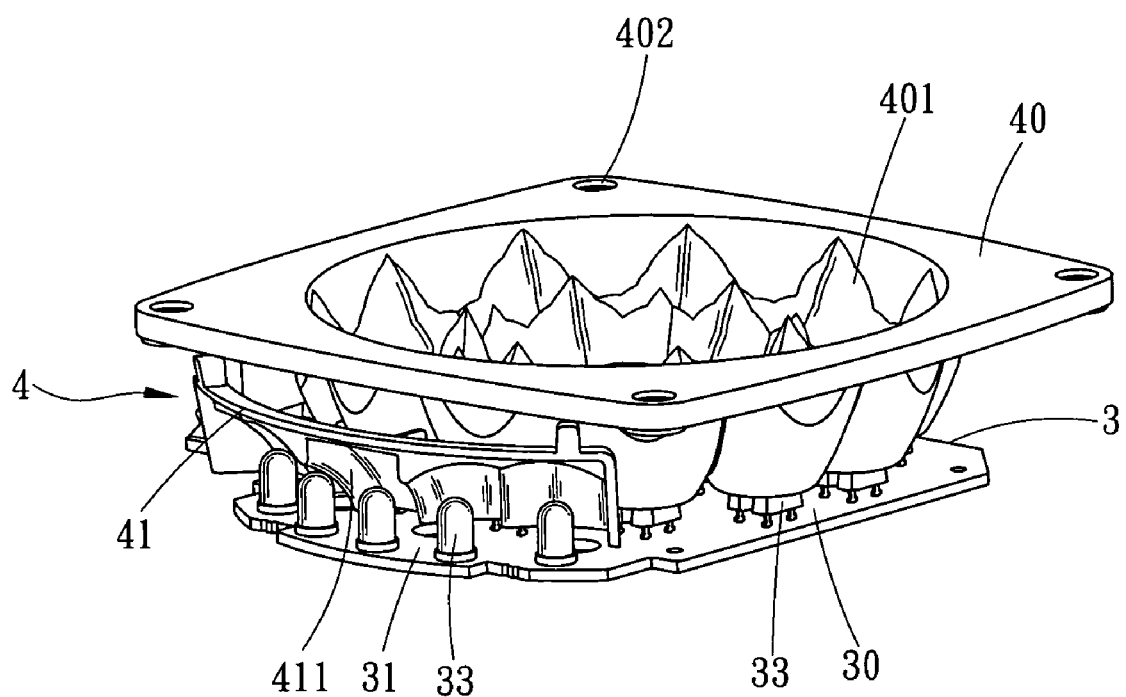
FIG. 3 is a perspective view of a circuit board combined with a reflective plate unit in the present invention.
Figure 4:
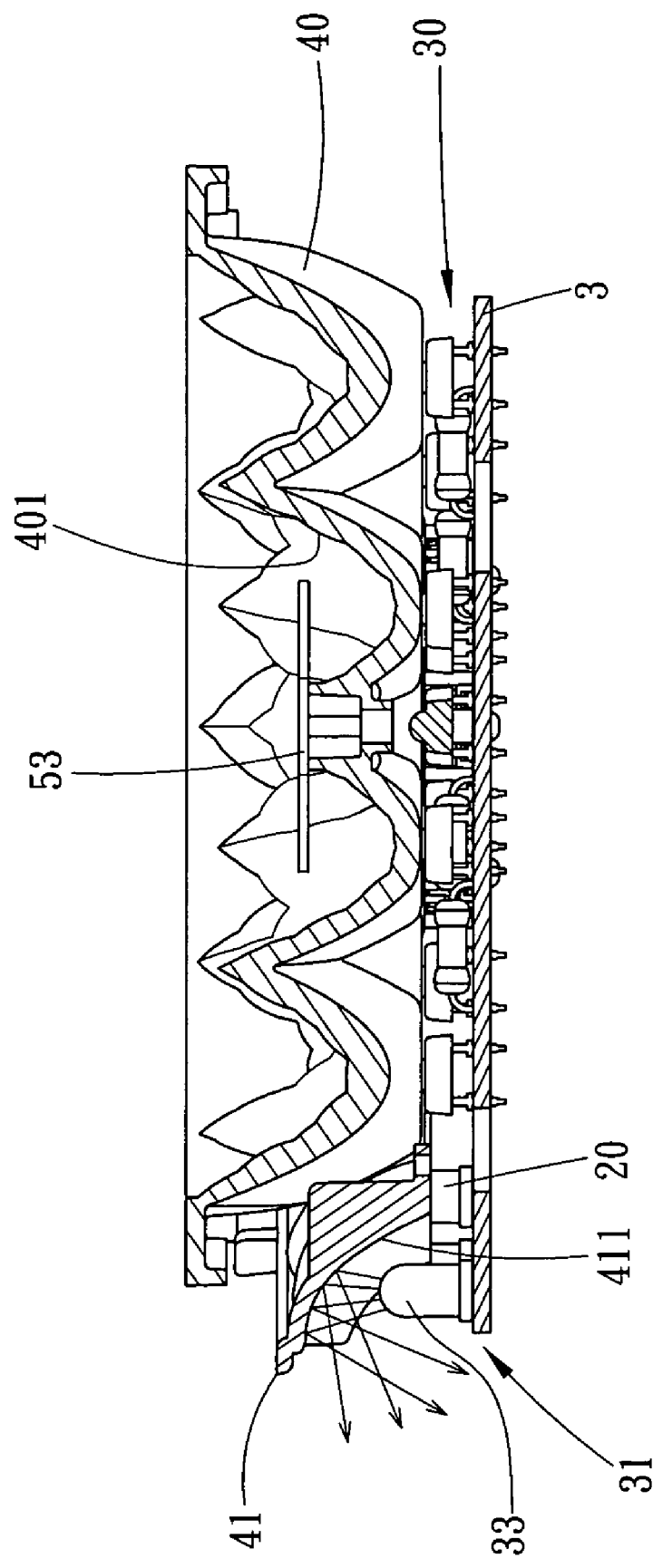
FIG. 4 is a cross-sectional view of FIG. 3.
Figure 5:
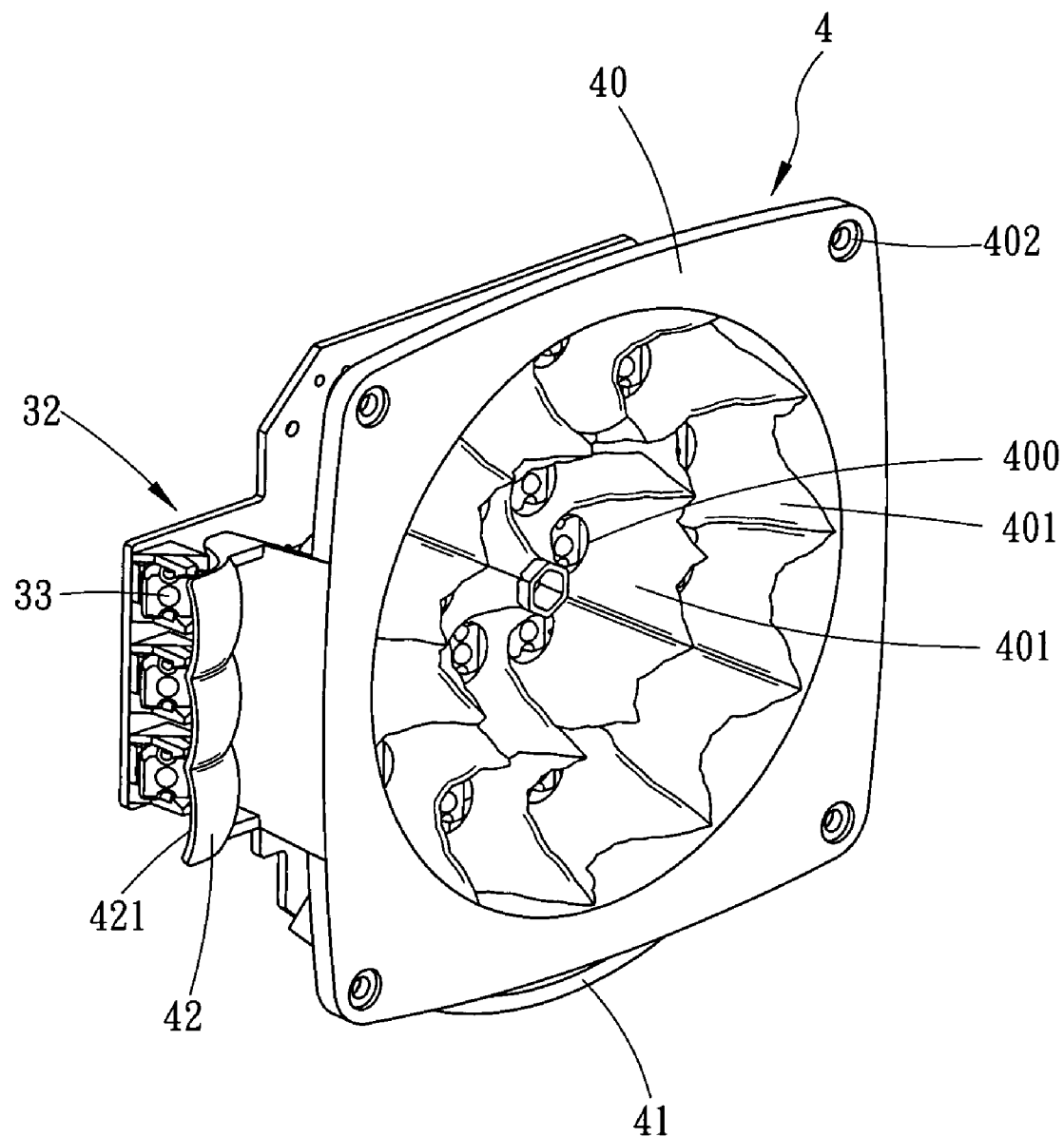
FIG. 5 is another perspective view of the circuit board combined with the reflective plate unit in the present invention; and, FIG. 6 is a cross-sectional view of FIG. 5.
Figure 6:
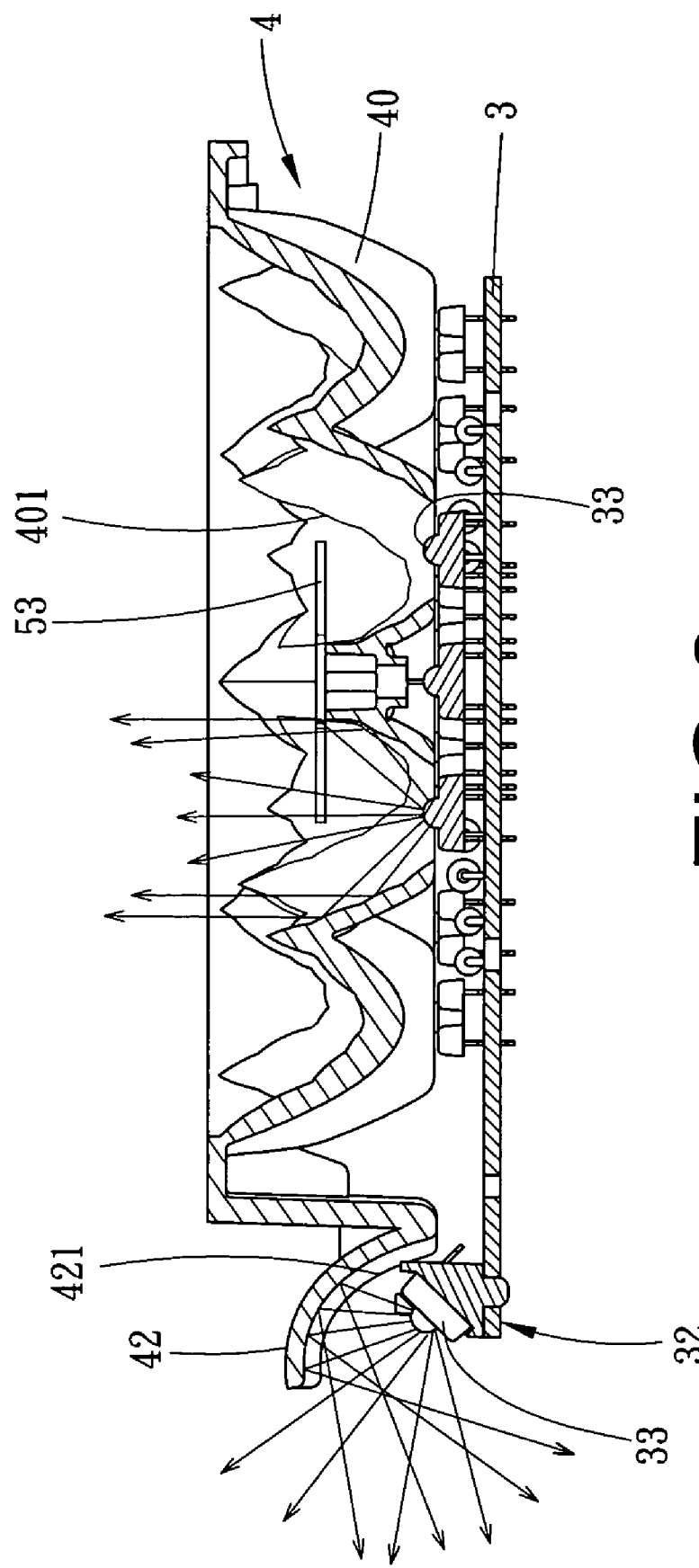

A reflective rear light for a truck in the present invention, as shown in FIGS. 2-6, includes a bottom base 1, a light base 2, a circuit board 3, a reflective plate unit 4, a light lens unit 5 as main components.

The bottom base 1 is provided with plural threaded posts 10 vertically at four corners, and plural openings 11 formed in sidewalls.

The light base 2 is placed in the bottom base 1, provided with plural threaded posts 20 vertically at four corners, and position pins 21 spaced apart and extending on a bottom.

The circuit board 3 is installed in the light base 2, provided with a main light section 30, a license-plate light section 31, and a sidelight section 32, plural LED lights 33 respectively set in those sections 30, 31, and 32. Then the license-plate light section 31 and the sidelight section 32 respectively face the openings 11. Further, the circuit board 3 is provided with plural holes 34 and plural position holes 35 aligned to the position pins 21 of the light base 2.

The reflective plate unit 4 is screwed with the light base 2, having a main reflective plate 40, a license-plate reflective plate 41 and a sidelight reflective plate 42. The main reflective plate 40 is located on the circuit board 3, provided with plural recessed holes 400 facing the main light section 30, and each recessed hole 400 is provided with a reflecting surface 401 on its inner wall. The license-plate reflecting plate 41 is fixed at one side of the main reflecting plate 40, facing the license-plate light section 31 and screwed with the light base, having an outer convex reflective surface 42. The side reflective plate 42 is connected to the rear side of the main reflective plate 40, facing the sidelight section 32 of the circuit board 3, having convex outer reflective surfaces 421. The main reflective plate 40 and the license-plate reflective plate 41 are provided with threaded holes 402 and 412 threadably combined with the threaded posts 20 with screws (N).

The light lens unit 5 is combined with the bottom base 1, consisting of a main light lens 50, a license-plate light lens 51, a sidelight lens 52 and an inner light lens 53. The inner light lens 53 is set in the main light reflective plate 40, and the main light lens 50 is connected on the bottom base 1, with the license-plate light lens 51 and the sidelight lens 52 respectively fitted in the openings 11 of the bottom base 1.

In assembling, as shown in FIGS. 2 to 6, firstly the circuit board 3 is installed in the light base 2, with the position holes 35 of the circuit board 3 fitting tightly with the position posts 21 of the light base 2. Then the holes 34 are aligned to and fitted through by the threaded posts 20, with the screws (N) threadably combining the license-plate reflective plate 41 in place. Then the four threaded holes 402 are aligned to the threaded posts 20, and the side reflective plate 42 is put to face the side light section 32 of the circuit board 3, with the inner light lens 53 screwed tightly in the main reflective plate 40. After that, the assembled components just mentioned are placed in the bottom base 1, with the four threaded holes 402 aligned to the threaded posts 20 of the main light base 2 and the threaded posts 10 of the bottom base 1 and threadably combined tightly with the screws (N). Then finally, the main light lens 50, the license-plate light lens 51 and the side light lens 52 of the light lens unit 5 are respectively fitted on the upper side of the bottom base 1 and the openings 11 thereof, finishing assembly of the reflective rear light for a truck in the invention.

In general, the invention has the circuit board 3 set with the LED lights divided into different indicating sections, and matched with the reflecting plates so that the LED lights can be reinforced in the reflecting way, gaining better effects.

While the preferred embodiment of the invention has been describe above, it will be recognized and understood that various modifications may be made therein and the appended claims are intended to cover all such modifications that fall within the spirit and scope of the invention.

What is claimed is:

1. A reflective rear light for a truck comprising:
   a bottom base provided with plural threaded posts located vertically at four corners and plural openings formed in sides;
   a light base placed in said bottom base and provided with plural threaded posts located vertically at four corners and position pins spaced apart and extending on a bottom;
   a light lens unit combined with said bottom base and consisting of a main light lens, a license-plate light lens, a sidelight lens, said license-plate light lens and said sidelight lens facing respectively said openings of said bottom base;
   a circuit board installed in said light base and having a main light section, a license-plate light section and a sidelight section, said main light section, said license-plate light section and said sidelight section respectively provided with plural LED lights, said license-plate light section and said sidelight section respectively facing said openings of said bottom base; and,
   a reflective plate unit combined with said light base and consisting of a main reflective plate, a license-plate reflective plate and a side reflective plate, said main reflective plate set on said circuit board, said main reflective plate provided with plural recessed holes, a reflective surface formed on an inner wall defining each said recessed hole, said license-plate reflective plate combined with said main reflective plate and screwed with said light base, said license-plate reflective plate having a reflective surface on an outer surface, said side reflective plate combined behind said main reflective plate and having a reflecting surface on an outer surface.

2. The reflective rear light for a truck as claimed in claim 1, wherein said circuit board is further provided with plural holes and plural position holes.

3. The reflective rear light for a truck as claimed in claim 1, wherein said light lens unit is further provided with an inner light lens fixed in said main reflective plate.

4. The reflective rear light for a truck as claimed in claim 1, wherein said main reflective plate and said license-plate reflective plate are respectively provided with threaded holes.

* * * * *